(12) United States Patent
Jagdale et al.

(10) Patent No.: US 9,726,212 B2
(45) Date of Patent: Aug. 8, 2017

(54) POSITIVE LOCKING GREASE PLUG (71) Applicant: CATERPILLAR INC., Peoria, IL (US)

(72) Inventors: Rakesh Dushyantrao Jagdale, Waco, TX (US); Dimitar Borissov Dostinov, Fort Worth, TX (US)

(73) Assignee: Caterpillar Inc., Peoria, IL (US)

( * ) Notice: Subject to any disclaimer, the term of this patent is extended or adjusted under 35 U.S.C. 154(b) by 166 days.

(21) Appl. No.: 14/523,735

(22) Filed: Oct. 24, 2014

(65) Prior Publication Data
US 2016/0115985 A1 Apr. 28, 2016

(51) Int. Cl.
*F16B 19/02* (2006.01)
*F16N 11/00* (2006.01)
*E02F 3/96* (2006.01)
*F01M 11/04* (2006.01)

(52) U.S. Cl.
CPC .............. *F16B 19/02* (2013.01); *F16N 11/00* (2013.01); *E02F 3/966* (2013.01); *F01M 2011/0491* (2013.01)

(58) Field of Classification Search
CPC .... Y10T 403/58; Y10T 403/589; E02F 3/966; F16C 39/32; B23Q 11/123; B25D 17/26; F16N 7/38; F16H 57/064; F16B 39/32
See application file for complete search history.

(56) References Cited

U.S. PATENT DOCUMENTS

| 1,337,717 A | 4/1920 | Martin et al. |
| RE15,526 E | 1/1923 | Lloyd, III |
| 1,549,783 A | 8/1925 | McLaughlin |
| 2,898,081 A | 8/1959 | Johnson |
| 4,051,921 A | 10/1977 | Sheldon |
| 6,227,782 B1 | 5/2001 | Bowling et al. |
| 7,097,402 B2 * | 8/2006 | Winker ................. F16B 33/002 411/114 |
| 7,641,429 B2 * | 1/2010 | DiStasio ................ F16B 39/32 411/114 |
| 8,425,168 B2 * | 4/2013 | Campau ................. F16B 39/20 411/251 |

(Continued)

FOREIGN PATENT DOCUMENTS

GB FR 359726 A * 0/1906 .............. F16B 39/32

OTHER PUBLICATIONS

IHS GlobalSpec, "Lock Washers Product Details", no date, accessed on Aug. 20, 2014 at http://www.globalspec.com/specsearch/partspecs?partId=%7b1A14D917-EFF7-4C54-9417-237DBF9FD0E0%7d&comp=826&vid=1513, 1 page.

(Continued)

*Primary Examiner* — Jonathan Masinick
(74) *Attorney, Agent, or Firm* — Hibshman Claim Construction PLLC (57) ABSTRACT

A plug assembly configured for installation in a hammer assembly, the plug assembly comprising a cylindrical plug and an anti-rotation component. The cylindrical plug may include a plug head and a plug body. The cylindrical plug may include a receiving feature located in the plug head. The anti-rotation component may include a first locking feature and a second locking feature. The first locking feature may be configured to fixably engage with the receiving feature. The second locking feature may be configured to engage with the hammer assembly.

20 Claims, 6 Drawing Sheets

(56) References Cited

U.S. PATENT DOCUMENTS

| | | | |
|---|---|---|---|
| 8,899,896 B1 * | 12/2014 | Campau | F16B 39/32 |
| | | | 411/248 |
| 2010/0266364 A1 * | 10/2010 | Campau | F16B 39/20 |
| | | | 411/299 |
| 2013/0081837 A1 | 4/2013 | Jagdale et al. | |
| 2014/0102740 A1 | 4/2014 | Jagdale | |

OTHER PUBLICATIONS

J.Lanfranco Inc., "Bolts, Screws, Washers and More . . . " brochure, no date, 52 pages.

Globalspec, "Washers Information", no date, accessed on Oct. 24, 2014 at http://www.globalspec.com/learnmore/mechanical_components/mechanical_fasteners/, 7 pages.

EPCO, "Zero-Leak Gold Plugs", no date, accessed on Jul. 31, 2014 at http://www.zeroleak.com/products/plugs.php, 3 pages.

EIS-RST Pullplugs, "EIS RST Metric Series Pullplugs", no date, accessed on Jul. 31, 2014, at http://eisinserts.com/eisrstpullplugs.html, 1 page.

Shakeproof, "SinuLOC ITW Shakeproof", accessed on Oct. 24, 2014, at http://shakeproof.itwautomotive.com/sinuloc/ 2 pages.

Specialty Fasteners & Components, "Spiralock Threading Locking", accessed on Oct. 24, 2014 at http://www.specialty-fasteners.co.uk/products/threaded-fasteners-thread-locking/spiralock-thread-locking, 2 pages.

\* cited by examiner

POSITIVE LOCKING GREASE PLUG

TECHNICAL FIELD

The present disclosure generally pertains to hydraulic hammers, and is more particularly directed toward a positive locking grease plug for a hydraulic hammer.

BACKGROUND

Hydraulic hammers are used on work sites to break up large hard objects before such objects can be moved away. Typically, the hammer assembly is powered by either a hydraulic or pneumatic pressure source or a combination of both. Moving parts within the hammer assembly require lubrication in order to maintain proper operation. Vibrational forces during operation of the hydraulic hammer may reduce the effectiveness of the lubrication.

U.S. Pat. No. 1,337,717 to A. Martin, et al., discloses a grease cup adapted to be used in connection with locomotives for containing grease for oiling moving parts of the locomotive. The grease cup includes a locking ring for manually holding the rotating part of the grease cup against reverse rotation with respect to the stationary portion of the grease cup, and at the same time permitting free rotation of the movable part when turned in to the stationary part of the cup.

The present disclosure is directed toward overcoming one or more of the problems discovered by the inventors.

SUMMARY OF THE DISCLOSURE

In an embodiment of the present application, a plug assembly for a hammer assembly is provided. The plug assembly includes a cylindrical plug and an anti-rotation component. The cylindrical plug may include a longitudinal central axis, a plug head, and a plug body. The plug head may include a top surface, a bottom surface located opposite the top surface, and an outer surface extending circumferentially about the central axis between the top surface and bottom surface. The plug body may extend along the central axis from the plug head opposite the bottom surface. The cylindrical plug may also include at least one receiving feature located in the plug head. The anti-rotation component may include a body including a first locking feature and a second locking feature. The first locking feature may be configured to fixably engage with the receiving feature, and the second locking feature may be configured to engage with the hammer assembly.

DETAILED DESCRIPTION

This disclosure relates to a hammer assembly and in particular, to components related to a grease channel of the hammer assembly. Components such as a plug assembly may include a grease plug and an anti-rotation component. The grease plug may include features to interface with the anti-rotation component. The anti-rotation component may include certain features to lock and seal the plug assembly to the grease channel. Certain features may include positive locking mechanisms and resilient materials. The plug assembly has applicability in various other types of machines as well. For example, the plug assembly may be used in applications involving a fluidic chamber that requires a sealant plug.

Figure 1:
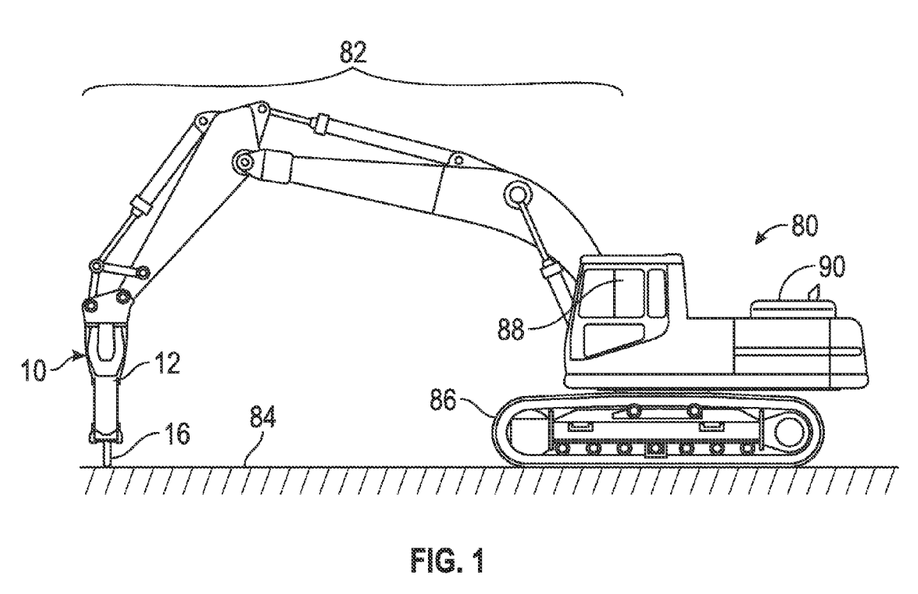
FIG. 1 is a perspective view of an example machine, which may us a hammer assembly according to an embodiment of the present disclosure.

FIG. 1 is a perspective view of an example machine, which may use a hammer assembly according to an embodiment of the present disclosure. A hammer assembly 10 may include a cylindrical housing 12 attached to a machine 80. The machine 80 may embody a fixed or mobile machine that performs some type of operation associated with an industry such as mining, construction, farming, transportation, or any other industry known in the art. For example, machine 80 may be an earth moving machine such as a backhoe, an excavator, a dozer, a loader, a motor grader, or any other earth moving machine. Machine 80 may include an implement system 82 configured to move the demolition hammer 10, a drive system 86 for propelling the machine 80, a power source 90 that provides power to implement system 82 and drive system 86, and an operator station 88 for operator control of implement system 82 and drive system 86.

Power source 90 may embody an engine such as, for example, a diesel engine, a gasoline engine, a gaseous fuel-powered engine or any other type of combustion engine known in the art. It is contemplated that power source 90 may alternatively embody a non-combustion source of power such as a fuel cell, a power storage device, or another source known in the art. Power source 90 may produce a mechanical or electrical power output that may then be converted to hydraulic pneumatic power for moving the implement system 82.

Figure 2:
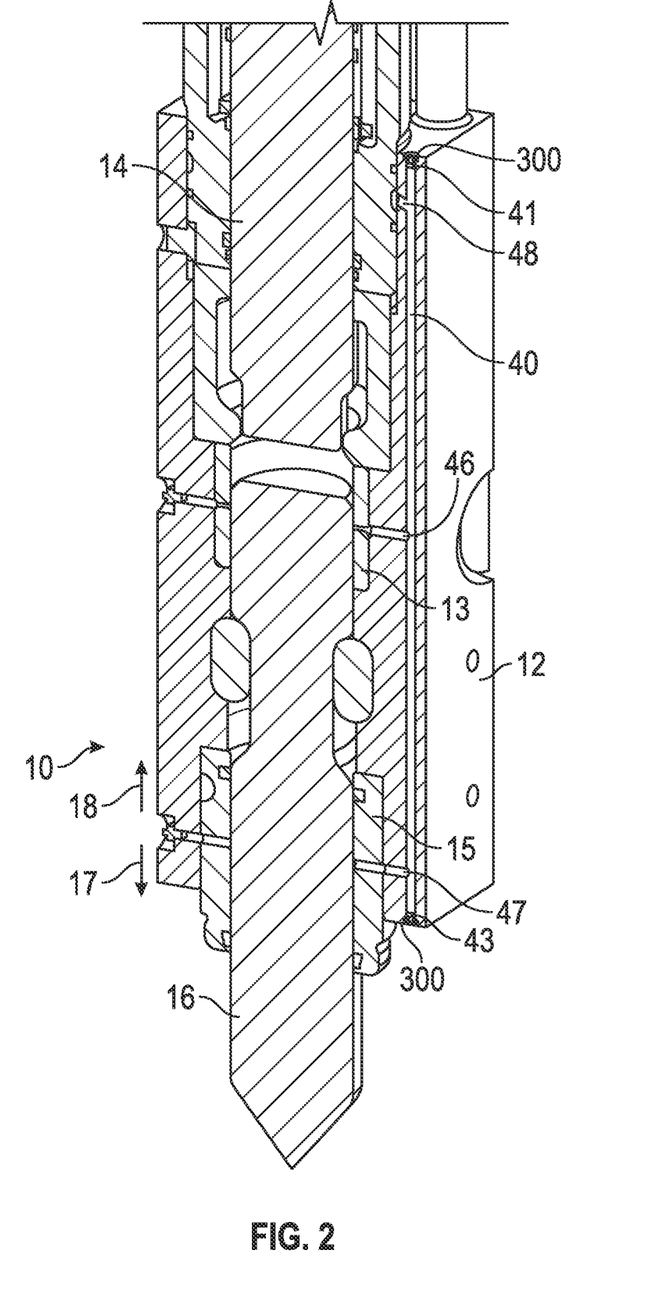
FIG. 2 is a perspective view of a cross section of hammer assembly 10 according to an embodiment of the present disclosure.

FIG. 2 is a perspective view of a cross section of hammer assembly 10 according to an embodiment of the present disclosure. In some embodiments, the hammer assembly 10 may be a structure forming an enclosed assembly with one or more openings providing access to an interior of the assembly. The hammer assembly 10 may include a cylindrical housing 12 within which a piston 14 may be slidably supported. Additionally, a work tool 16 may be supported in a lower end of the housing 12 with a portion of the work tool 16 extending outward therefrom. Work tool 16 may be adjacent to an upper bushing 13 and a lower bushing 15. The work tool 16 may have any configuration, such as for example a chisel, that would be useful in hammering applications. The work tool 16 also may be configured so as to be removable so as to allow a variety of tools with different configurations to be attached to the hammer assembly 10.

The piston 14 may be supported so as to be movable relative to the housing 12 in a reciprocating manner generally in the direction of arrows 17 and 18. More specifically, during an impact or work stroke, the piston 14 moves in the general direction of arrow 17 and near the end of the work stroke comes into contact with the work tool 16 such as shown in FIG. 2. Conversely, during a return stroke, the piston 14 retracts away from contact with the work tool 16 in the general direction of arrow 18. The reciprocating impacts of the piston 14 on the work tool 16, in turn, drive a corresponding reciprocating movement of the work tool 16. When the piston 14 strikes the work tool 16, the force of the piston 14 is transmitted to the work tool 16 in the general direction of arrow 17. This force may be applied to a hard object such as rock, concrete or asphalt in order to break up the object.

A grease channel 40 may be located on one side of cylindrical housing 12. In some embodiments, an identical grease channel may be located on the other side of cylindrical housing 12 (not shown). Grease channel 40 may be in fluid communication with certain components of the hammer assembly, such as, but not limited to, work tool 16 and a grease pump (not shown). In particular, grease, or some other lubricating fluid, may enter through an inlet channel 48 from an outside grease pump (not shown). From there, grease may travel through grease channel 40. Grease may then travel through outlet channel 46 and/or outlet channel 47. Grease entering through outlet channel 46 may lubricate upper bushing 13. This may aid in the lubrication between upper bushing 13 and work tool 16. Grease entering through outlet channel 47 may lubricate lower bushing 15. This may aid in the lubrication between lower bushing 15 and work tool 16.

Grease channel 40 may include an upper grease hole 41 located at the upper end of grease channel 40 and a lower grease hole 43 located at the lower end of grease channel 40 (hereinafter may be referred to collectively as grease holes). Upper grease hole 41 and lower grease hole 43 may be identical to one another. In particular embodiments, grease holes may be a sealant location to shut off the flow of grease to the outside. In some instances, this may aid in preventing grease from excessively leaking during operation of the hammer assembly. Either grease hole may be closed off by a plug assembly 300 as explained in the following description.

Figure 3:
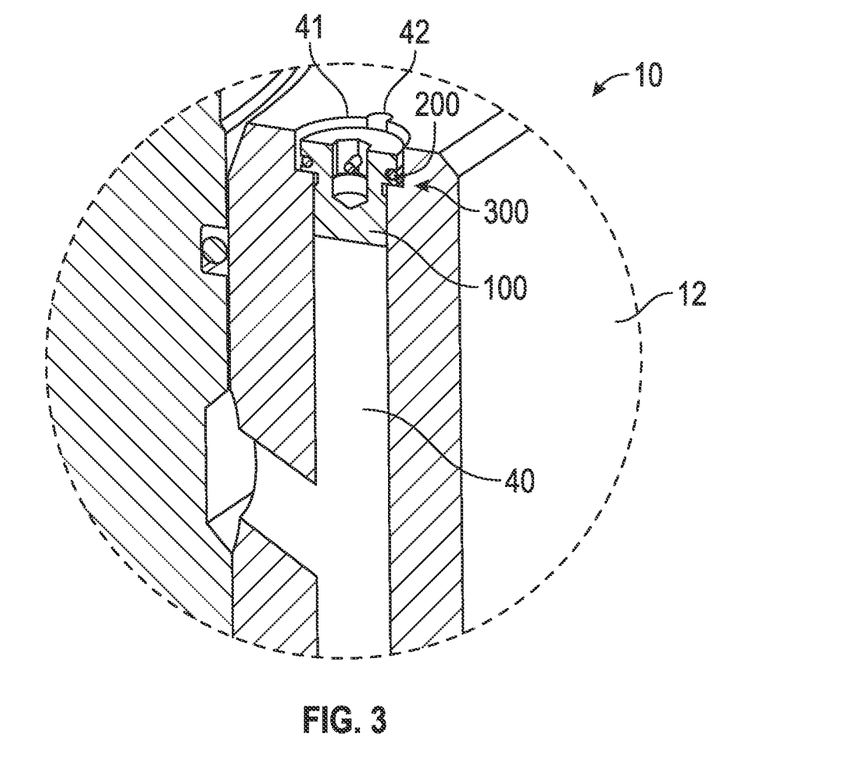
FIG. 3 is an enlarged view of a portion of the cross section of hammer assembly 10 depicted in FIG. 2.

FIG. 3 depicts an enlarged view of the embodiment of hammer assembly 10 depicted in FIG. 2. Some details of hammer assembly may have been removed or adjusted from the figure for clarity. As shown, plug assembly 300 may be located in upper grease hole 41. An identical plug assembly 300 may also be located in lower grease hole 43 (not shown). Grease holes may be a circular opening configured to receive a plug, such as plug assembly 300. Grease holes may feature a counter bore. In addition, grease holes may also include a slot 42 adjacent to one section of the opening of the grease hole. In some embodiments, grease holes may include at least two slots 42 located opposite from one another. Plug assembly 300 may be inserted into grease holes to seal the opening of a grease hole from potential grease leakage.

Plug assembly 300 may include components that secure and maintain proper engagement of plug assembly 300 to housing 12 during operation of hammer assembly 10. These components may include, but are not limited to, a grease plug 100 and an anti-rotation component 200. In some embodiments, grease plug 100 and anti-rotation component 200 may engage with certain features of grease holes, such as slot 42, to secure and maintain the proper engagement of plug assembly 300 to housing 12.

Figure 4:
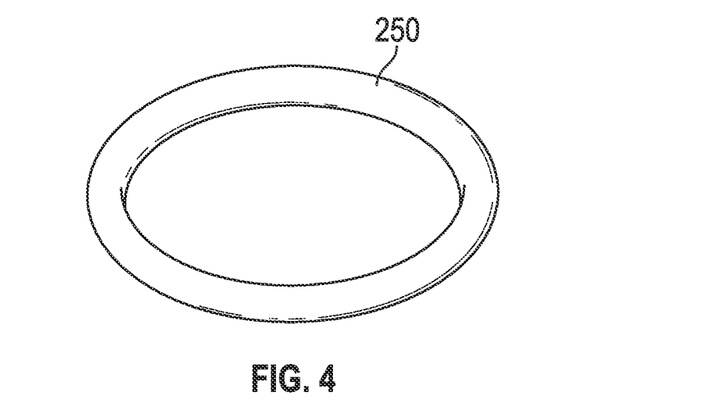
FIG. 4 is a perspective view of an embodiment of o-ring 250.

FIG. 4 depicts a perspective view of an embodiment of o-ring 250. O-ring 250 may be a circular ring including a constant outer diameter from 6 millimeters to 111 millimeters (mm). In some embodiments, o-ring 250 may include an outer diameter from 6 mm to 50 mm. In some embodiments, o-ring 250 may include an outer diameter about 14 mm. In some embodiments, o-ring 250 may include a height of about 1 mm. O-ring 250 may preferably be designed to fit tightly within a retaining groove such as retaining groove 112 described in FIG. 6 below. O-ring 250 may be composed of a material such as rubber or a similar material. In certain embodiments, o-ring 250 may be configured to seal grease plug 100 to a grease hole such as upper grease hole 41.

Figures 5, 6, 7, 8:
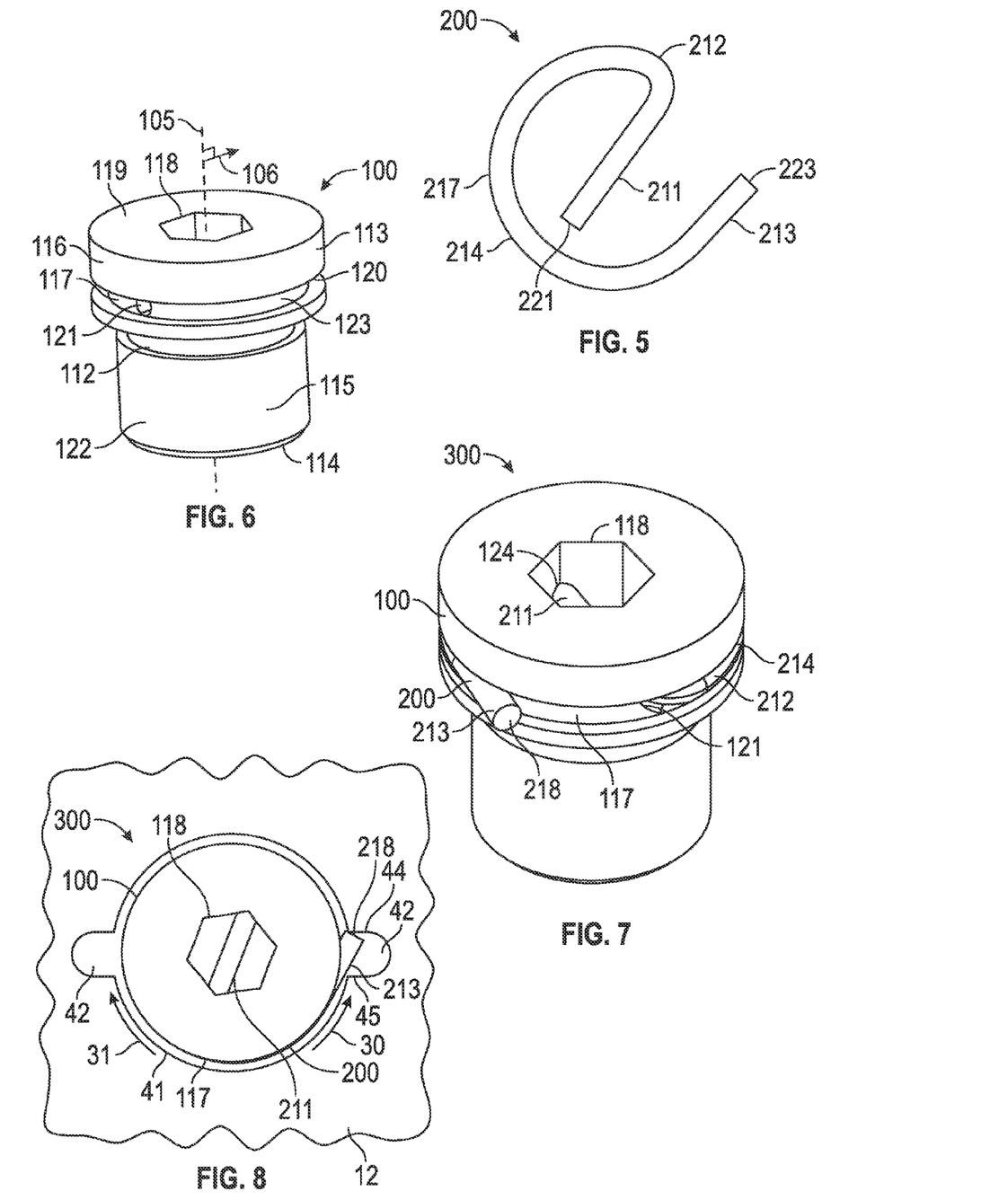
FIG. 5 is a plan view of an embodiment of anti-rotation component 200.
FIG. 6 is a perspective view of an embodiment of grease plug 100.
FIG. 7 is a perspective view of an embodiment of plug assembly 300.
FIG. 8 is a top view of the embodiment of plug assembly 300 depicted in FIG. 7 installed in upper grease hole 41 of a cylindrical housing 12 within a hammer assembly.

FIG. 5 depicts a plan view of an embodiment of anti-rotation component 200. In some embodiments, anti-rotation component 200 may feature a cylindrical tube including a constant diameter. In some embodiments, anti-rotation component 200 may be formed from a wire. Anti-rotation component may include a diameter from 1 mm to 5 mm. In some embodiments, anti-rotation component includes a diameter of 1.8 mm. Anti-rotation component 200 may include a first end 221 and a second end 223. First end 221 and second end 223 may be located opposite one another. In some embodiments, anti-rotation component 200 may feature a bended shape resembling the letter "e". Anti-rotation component 200 may include a first locking feature 211 (hereinafter may be referred to as plug locking feature), a second locking feature 213 (hereinafter may be referred to as slot locking feature), a bend 212, and a rounded portion 217. First locking feature 211 may be located proximate first end 221, and second locking feature 213 may be located proximate second end 223. As shown, first locking feature 211 may be a straight linear portion, and second locking feature 213 may also be a straight linear portion. First end 221 may transition to bend 212. Bend 212 may feature a sharply curved portion. Bend 212 may transition to rounded portion 217. Rounded portion 217 may feature a semi-circular portion. Rounded portion 217 may transition to second end 223.

FIG. 6 depicts a perspective view of an embodiment of grease plug 100. In certain embodiments, grease plug 100 may include a plug head 113, a plug base 114, a plug body 115, a retaining groove 112, a receiving feature 117, and a socket 118. Grease plug 100 may be solidly revolved around a central axis 105. References to radial, axial, and circumferential directions and measures refer to axis 105, unless specified otherwise, and terms such as "inner" and "outer" generally indicate a lesser or greater radial distance from, wherein a radial 106 may be in any direction perpendicular and radiating outward from axis 105.

In some embodiments, plug head 113 may feature a circular structure including a top surface 119, a bottom surface 120 (not shown), and an outer surface 116. Top surface 119 and bottom surface 120 may be located at opposite ends of plug head 113. In addition, plug head 113 may include a length from 3 mm to 5 mm and may include a diameter from 15 mm to 25 mm. In some embodiments, plug head 113 may include a length about 5 mm and a diameter about 20 mm. Socket 118 may be centrally located in top surface 119 and aligned to axis 105. Socket 118 may feature a hexagonal hole extending a certain distance from top surface 119. In some embodiments, socket 118 may include an across flat distance from 4 mm to 6 mm and a depth from 3 mm to 5 mm. Socket 118 may include an across flat distance approximately 6 mm and a depth approximately 5 mm. In addition, socket 118 may be configured to receive a tool, such as a driver or a wrench, to rotate grease plug 100 during installation.

As shown in the figure, receiving feature 117 may be located in plug head 113. Receiving feature 117 may be a channel ring (sometimes referred to as a plug head groove) located a certain distance in between top surface 119 and bottom surface 120. The channel ring may extend circumferentially around the outer surface. In some instances, the channel ring of receiving feature 117 includes a circular cross-section. In other instances, the channel ring of receiving feature 117 includes a rectangular cross-section as shown in the figure. The surface of the channel ring may be an inner surface 123. Inner surface 123 may be a surface offset a certain distance inwards from outer surface 116. The channel ring of receiving feature 117 may include a depth ranging 1 mm to 5 mm and a width from 1 mm to 5 mm. In some embodiments, the channel ring of receiving feature 117 may include a depth approximately 1.8 mm and a width approximately 1.8 mm. In some instances, the channel ring of receiving feature 117 may include a width equal or more than the diameter of anti-rotation component 200.

Receiving feature 117 may be configured to receive anti-rotation component 200. In some embodiments, receiving feature 117 may function as a guide for installation of anti-rotation component 200. Receiving feature 117 may include a first hole 121 extending a certain depth from the outer surface of receiving feature 117 into plug head 113. First hole 121 may extend all the way through plug head 113 to socket 118. A second hole 124 may be located on the opposite side of plug head 113 (shown in FIG. 7). The two holes may extend all the way through plug head 113, creating a through-hole through plug head 113. In such embodiments, the two holes may aid in the installation process of anti-rotation component 200 by providing two receiving locations for anti-rotation 200. First hole 121 and second hole 124 may include a diameter from 1 mm to 5 mm. In some embodiments, first hole 121 and second hole 124 may include a diameter of 2 mm. In some embodiments, first hole 121 and second hole 124 may include a diameter slightly larger than the diameter of anti-rotation component 200. As will be explained below for FIG. 7, certain features of anti-rotation component 200 may be configured to engage with certain features of receiving feature 117, and first hole 121, and second hole 124.

Retaining groove 112 maybe located axially adjacent to plug head 113. In some embodiments, retaining groove 112 may be a channel extending a certain depth from outer surface 122 into plug body 115. Retaining groove 112 may include a depth about 1 mm and a width about 12 mm. Retaining groove 112 may be configured to retain a sealant mechanism, such as o-ring 250.

Plug body 115 may be located axially adjacent to retaining groove 112. Plug body 115 may feature a cylindrical structure extending from retaining groove 112. In some embodiments, outer surface 122 of plug body 115 may be threaded. In addition, outer surface 122 may be tapered. Plug body 115 may include a diameter from 6 mm to 111 mm and a length ranging from 10 mm to 50 mm. In some embodiments, plug body 115 may include a diameter from 6 mm to 50 mm and a length ranging from 10 mm to 25 mm. In some embodiments, plug body 115 may include a diameter approximately 14 mm and a length approximately 11 mm. Plug base 114 may be located axially adjacent to plug body 115.

FIG. 7 depicts a perspective view of an embodiment of plug assembly 300. As shown, plug assembly 300 may include the embodiment of grease plug 100 illustrated in FIG. 6 and the embodiment of anti-rotation component 200 depicted in FIG. 5. O-ring 250, depicted in FIG. 4, may also be included in plug assembly 300 but is not shown assembled here. First locking feature 211 may be assembled to receiving feature 117. In some embodiments, first locking feature 211 of anti-rotation component 200 may be inserted into first hole 121 and second hole 124 of receiving feature 117. As shown, the straight linear portion of first locking feature 211 may travel through first hole 121, socket 118, and second hole 124. The sharply curved portion of bend 212 may wrap around the outer edge of first hole 121 and around a portion of the channel ring of receiving feature 117. The combination of first locking feature 211 and bend 212 may lock anti-rotation component 200 to grease plug 100. The semi-circular portion of rounded portion 217 may wrap circumferentially around the channel ring of receiving feature 117. In addition, the straight linear portion of second locking feature 213 may circumferentially extend past receiving feature 117. In some embodiments, second locking feature 213 may extend past receiving feature 117 about 2 mm to 3 mm. In particular embodiments, second locking feature 213 may extend past receiving feature 117 about 1.5 times the diameter of anti-rotation 200. The end of second locking feature 213 may include an interference surface 218. Interference surface 218 may be configured to engage with certain features of the hammer assembly, as described in FIG. 8 below.

FIG. 8 depicts a top view of an embodiment of plug assembly 300 installed in upper grease hole 41 of cylindrical housing 12 within a hammer assembly. Upper grease hole 41 may be located in a cylindrical housing 12 of a hammer assembly 10, such as the hammer assembly 10 depicted in FIG. 3. An identical plug assembly 300 may be installed in lower grease hole 43. This embodiment of plug assembly 300 may be the same as the embodiment depicted in FIG. 7. Anti-rotation component 200 may be pre-assembled with grease plug 100 to form plug assembly 300 before installing plug assembly 300 into upper grease hole 41. Normal installation of plug assembly 300 may require a clockwise turning direction as indicated by arrow 31. In instances where the plug body of grease plug 100 is threaded, plug assembly 300 may be screwed into upper grease hole 41 in the clockwise turning direction indicated by arrow 31. Upon complete rotation of plug assembly 300 into upper grease hole 41, o-ring 250 may be compressed between plug head 113 and upper grease hole 41 (not shown). In some embodiments, a sealant, such as one made by Loctite®, may be applied to seal the threading of the grease plug to the grease hole.

Components of anti-rotation component 200, such as second locking feature 213, may be compressed between receiving feature 117 (not shown) and the walls of upper grease hole 41. During the installation process, the orientation of second locking feature 213 may allow plug assembly 300 to rotate freely in the clockwise direction. For example, as shown in the figure, plug assembly 300 may rotate to a position in which second locking feature 213 springs out into slot 42. This may be due to the release of compression forces. Second locking feature 213 may engage with a second face 45 of slot 42. Due to the resiliency of anti-rotation component 200 and its components, second locking feature 213 may compress back into receiving feature 117 upon further clockwise rotation of grease plug 300. In such instances, interference surface 218 does not engage and cause interference with second face 45. This may be due to the orientation of second locking feature 213 in relation to second face 45.

In certain situations, such as during operation of the hammer assembly, plug assembly 300 may rotate opposite the direction of the screwing process, in this case counter-clockwise, within upper grease hole 41, despite frictional resistance from the threading of plug body 115 and upper grease hole 41. Plug assembly 300 may rotate counter-clockwise to a position in which second locking feature 213 springs out into slot 42. In this position, second locking feature 213 may be oriented at an angle in which interference surface 218 substantially contacts a first face 44 of slot 42. Interference surface 218 may catch onto first face 44 and prevent further counter-clockwise rotation of plug assembly 300. This engagement between second locking feature 213 and slot 42 may lock plug assembly 300 to upper grease hole 41. The diameter of anti-rotation component 200 may be large enough to provide sufficient surface area for interference surface 218 to substantially interfere with first face 44.

In some embodiments, plug assembly 300 may be installed into upper grease hole 41 in a counterclockwise direction, in which second locking feature 213 may be oriented in an opposite manner to the description above.

Figure 9:
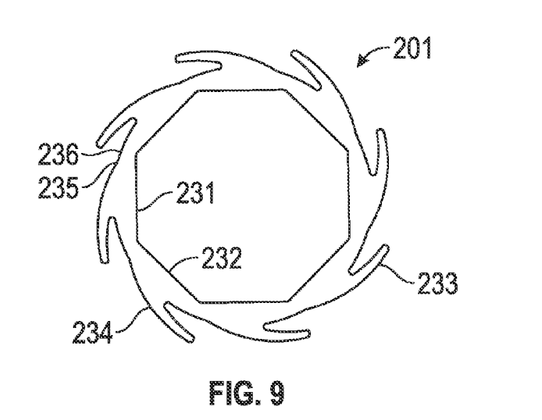
FIG. 9 is a plan view of an embodiment of anti-rotation component 200.

FIG. 9 depicts a plan view of an embodiment of an anti-rotation component 201. Anti-rotation component 201 may include a first locking feature 231 (hereinafter may be referred to as plug locking feature), a second locking feature 233 (hereinafter may be referred to as slot locking feature), an inner opening 232 and an outer wall 235. Inner opening 232 may be a polygonal ring. Outer wall 236 may be a circular ring and include an outer surface 236. Inner opening 232 may include an across flat distance from 6 mm to 111 mm. In some embodiments, inner opening 232 may include an across flat distance from 6 mm to 50 mm. In some embodiments, inner opening 232 may include an across flat distance about 14 mm. As illustrated, inner opening 232 may be an octagonal ring composed of eight sides. In some embodiments, first locking feature 231 may be any side of inner opening 232. In some embodiments, first locking feature 231 may be all sides of inner opening 232. Anti-rotation component 201 may include a thickness from 1 mm to 10 mm. In some embodiments, anti-rotation component 201 may include a thickness about 1 mm.

In certain instances, second locking feature 233 may feature a tooth which may extend from the outer surface 236 of outer wall 235. In some embodiments, each tooth may include a length about 3 mm. Furthermore, in some embodiments, the length of each tooth may be about 3× the thickness of anti-rotation component 201. In certain instances, the outer diameter of anti-rotation component 201 (including the teeth) may be 6 mm to 111 mm. In some embodiments, the outer diameter of anti-rotation component 201 (including the teeth) may be 21 mm. In certain embodiments, the outer diameter of anti-rotation component 201 (including the teeth) may be 1 mm to 2 mm greater than the diameter of a grease hole such as upper grease hole 41. In some embodiments, anti-rotation component 201 may include a plurality of second locking features. In some embodiments, anti-rotation component 201 may include eight second locking features 233.

Figure 10:
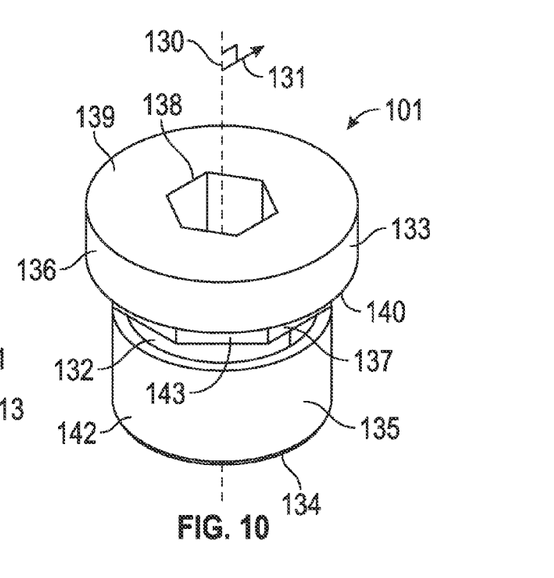
FIG. 10 is a perspective view of an embodiment of grease plug 100.

FIG. 10 depicts a perspective view of an embodiment of a grease plug 101. In certain embodiments, grease plug 101 may include a plug head 133, a plug base 134, a plug body 135, a retaining groove 132, a receiving feature 137, and a socket 138. Grease plug 101 may be solidly revolved around a central axis 130. References to radial, axial, and circumferential directions and measures refer to axis 130, unless specified otherwise, and terms such as "inner" and "outer" generally indicate a lesser or greater radial distance from, wherein a radial 131 may be in any direction perpendicular and radiating outward from axis 130.

In some embodiments, plug head 133 may feature a circular structure including a top surface 139, a bottom surface 140 (not shown), and an outer surface 136. Top surface 139 and bottom surface 140 may be located at opposite ends of plug head 133. In addition, plug head 133 may include a length from 3 mm to 5 mm and may include a diameter from 15 mm to 25 mm. Plug head 133 may include a length about 5 mm and a diameter about 20 mm. Socket 138 may be centrally located in top surface 139 and aligned to axis 130. Socket 138 may feature a hexagonal hole extending a certain distance from top surface 139. In some embodiments, socket 138 may include an across flat distance from 4 mm to 6 mm and a depth from 3 mm to 5 mm. Socket 138 may include an across flat distance approximately 6 mm and a depth approximately 5 mm. In addition, socket 138 may be configured to receive a tool, such as a driver or a wrench, to rotate grease plug 101 during installation.

Plug head 133 may include receiving feature 137. As shown, receiving feature 137 may be located axially adjacent to plug head 133. Receiving feature 137 may extend along axis 130 away from bottom surface 140 a certain distance. Receiving feature 137 may be configured to receive anti-rotation component 201. In some embodiments, receiving feature 137 may be a channel ring (sometimes referred to as a polygonal ring) including an inner surface 143 offset a certain distance inwards from outer surface 136. The channel ring may extend circumferentially around outer surface 136. In particular embodiments, inner surface 143 may be represented by the surfaces of all of the walls of the channel ring. In some instances, inner surface 143 may be represented by a surface of one wall of the channel ring. In some embodiments, the channel ring may be a polygonal ring composed of a plurality of sides. In some embodiments, the channel ring may be an octagonal ring composed of eight sides. Furthermore, in particular embodiments, the channel ring of receiving feature 137 may match the perimeter of the inner opening 232 of anti-rotation component 201, such as the embodiment depicted in FIG. 9. Inner surface 143 may be offset from outer surface 136 a distance about 2 mm to 5 mm. In some embodiments, the channel ring may include an across flat distance from 6 mm to 111 mm. In some embodiments, the channel ring may include an across flat distance from 6 mm to 50 mm. In some embodiments, the channel ring may include an across flat distance about 14 mm. In some embodiments, the length of the channel ring may be from 1 mm to 5 mm. In some embodiments, the length of the channel ring may be about 2 mm.

In some embodiments, plug body 135 may include all structural components located axially below plug head 133. Plug body 135 may be a cylindrical structure. In some embodiments, an outer surface 142 of plug body 135 may be threaded. In addition, outer surface 142 may be tapered. Plug body 135 may include a diameter from 6 mm to 111 mm and a length ranging from 10 mm to 50 mm. In some embodiments, plug body 135 may include a diameter approximately 14 mm and a length approximately 11 mm. Plug base 134 may be located axially adjacent to plug body 135.

Retaining groove 132 may be a channel located a certain depth from outer surface 142 into plug body 135. Retaining groove 132 may be located axially adjacent to plug head 133. In some embodiments, retaining groove 132 may include a depth about 1 mm and a width about 12 mm. Retaining groove 132 may be configured to receive a sealant mechanism, such as o-ring 250.

Figure 11:
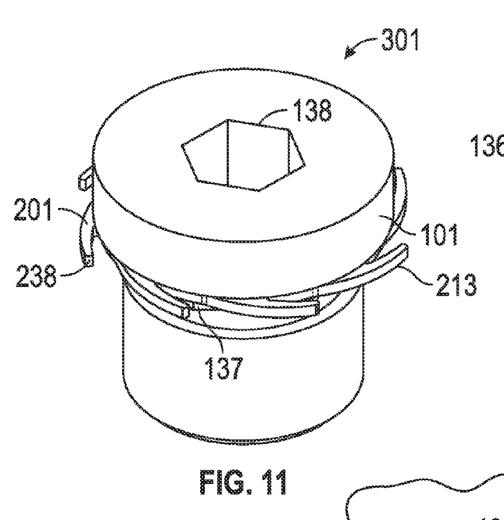
FIG. 11 is a perspective view of an embodiment of plug assembly 300.

FIG. 11 depicts a perspective view of an embodiment of a plug assembly 301. As shown, plug assembly 300 may include the embodiment of grease plug 101 illustrated in FIG. 10 and the embodiment of anti-rotation component 201 depicted in FIG. 9. O-ring 250, depicted in FIG. 4, may also be included in plug assembly 301 but is not shown assembled here. In some embodiments, anti-rotation component 201 may compress o-ring 250 after installation of anti-rotation component 201. Anti-rotation component 201 may be mounted onto receiving feature 137 of grease plug 101. In some embodiments, inner wall 232 of anti-rotation component 201 may be adjoined to the outer surface of receiving feature 137. Each edge of inner wall 232 may align with a corresponding edge of receiving feature 137. In certain instances, first locking feature 231 may be an edge of inner wall 232 aligned with an edge of receiving feature 137. The alignment of first locking feature 231 with an edge of receiving feature 137 may impede rotation of anti-rotation component 201 about receiving feature 137. The intersection of an edge to another edge may be at an angle which may prevent an edge of inner wall 232 from rotating past an edge of receiving feature 137. Each edge of inner wall 232 may be a first locking feature 231, in which all first locking features 231 may act singularly, or cumulatively, to impede the rotation of anti-rotation component 201 about receiving feature 137.

Each second locking feature 233 may extend circumferentially outwards from receiving feature 137. The end of each second locking feature 233 may include an interference surface 238. Interference surface 238 may be configured to engage with certain features of the hammer assembly, as described in FIG. 12 below.

Figure 12:
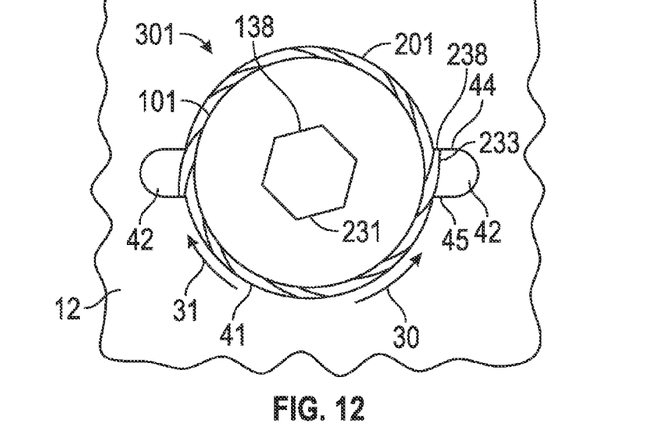
FIG. 12 is a top view of the embodiment of plug assembly 300 depicted in FIG. 11 installed in upper grease hole 41 of a cylindrical housing 12 within a hammer assembly.

FIG. 12 depicts a top view of an embodiment of plug assembly 301 installed in upper grease hole 41 of cylindrical housing 12 within a hammer assembly. Upper grease hole 41 may be located in a cylindrical housing 12 of a hammer assembly 10, such as the hammer assembly 10 depicted in FIG. 3. An identical plug assembly 301 may be installed in lower grease hole 43. This embodiment of plug assembly 301 may be the same as the embodiment depicted in FIG. 11. Anti-rotation component 201 may be pre-assembled with grease plug 101 to form plug assembly 301 before installing plug assembly 301 into upper grease hole 41. Normal installation of plug assembly 301 requires a clockwise turning direction as indicated by arrow 31. In instances where the plug body of grease plug 101 is threaded, plug assembly 301 may be screwed into upper grease hole 41 in the clockwise turning direction indicated by arrow 31. Upon complete rotation of plug assembly 301 into upper grease hole 41, o-ring 250 may be compressed between plug head 133 and upper grease hole 41 (not shown). In some embodiments, a sealant, such as one made by Loctite®, may be applied to seal the threading of the grease plug to the grease hole.

Components of anti-rotation component 201, such as second locking feature 233, may be compressed between receiving feature 137 (not shown) and the walls of upper grease hole 41. During the installation process, the orientation of second locking feature 233 may allow plug assembly 301 to rotate freely in the clockwise direction. For example, as shown in the figure, plug assembly 301 may rotate to a position in which second locking feature 233 springs out into slot 42. This may be due to the release of compression forces. Second locking feature 233 may engage with a second face 45 of slot 42. Due to the resiliency of anti-rotation component 201 and its components, second locking feature 233 may compress back into receiving feature 137 upon further clockwise rotation of grease plug 301. In such instances, interference surface 238 does not engage and cause interference with second face 45. This may be due to the orientation of second locking feature 233 in relation to second face 45.

In certain situations, such as during operation of the hammer assembly, plug assembly 301 may rotate opposite the direction of the screwing process, in this case counter-clockwise, within upper grease hole 41, despite frictional resistance from the threading of plug body 135 and upper grease hole 41. Plug assembly 301 may rotate counter-clockwise to a position in which second locking feature 233 springs out into slot 42. In this position, second locking feature 233 may be oriented at an angle in which interference surface 238 substantially contacts a first face 44 of slot 42. Interference surface 238 may catch onto first face 44 and prevent further counter-clockwise rotation of plug assembly 301. This engagement between second locking feature 233 and slot 42 may lock plug assembly 301 to upper grease hole 41. The diameter of anti-rotation component 201 may be large enough to provide sufficient surface area for interference surface 238 to substantially interfere with first face 44.

Figure 13:
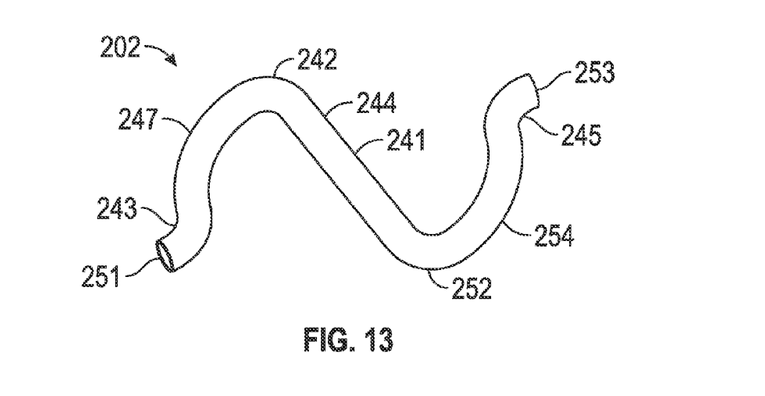
FIG. 13 is a plan view of an embodiment of anti-rotation component 200.

FIG. 13 depicts a plan view of an embodiment of an anti-rotation component 202. In some embodiments, anti-rotation component 202 may feature a cylindrical shape including a constant diameter. Anti-rotation component 202 may include a diameter from 1 mm to 5 mm. In some embodiments, anti-rotation component 202 includes a diameter of 1.8 mm. Furthermore, anti-rotation component 202 may include a first end 251 and a second end 253. First end 251 and second end 253 may be located opposite one another. In some embodiments, anti-rotation component 202 may feature a bended shape resembling the letter "s". Anti-rotation component 202 may include a first locking feature 241 (hereinafter may be referred to as plug locking feature), a second locking feature 243 (hereinafter may be referred to as first slot locking feature), a third locking feature 245 (hereinafter may be referred to as second slot locking feature), a first bend 242, a second bend 252, a first rounded portion 247, and a second rounded portion 254. First locking feature 241 may be located in the middle of anti-rotation component 202. First locking feature 241 may be a straight linear portion. In the direction towards first end 251, first locking feature 241 may transition to first bend 242. First bend 242 may be a sharply curved portion. Continuing in this direction, first bend 242 may transition to first rounded portion 247. First rounded portion 247 may be a semi-circular portion. Continuing in this direction, first rounded portion 247 may transition to second locking feature 243. Second locking feature 243 may be a bent portion.

A mirrored structural arrangement of second bend 252, second rounded portion 254, and third locking feature 245 may be formed from first locking feature 241 towards the direction of second end 253.

Figure 14:
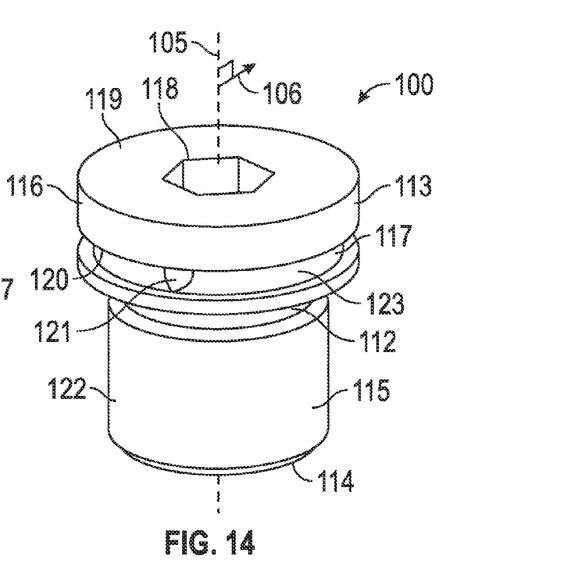
FIG. 14 is a perspective view of an embodiment of grease plug 100.

FIG. 14 depicts a perspective view of an embodiment of grease plug 100. The depicted embodiment of grease plug 100 may be identical to the grease plug 100 depicted in FIG. 6. In certain embodiments, grease plug 100 may include a plug head 113, a plug base 114, a plug body 115, a retaining groove 112, a receiving feature 117, and a socket 118. Grease plug 100 may be solidly revolved around a central axis 105. References to radial, axial, and circumferential directions and measures refer to axis 105, unless specified otherwise, and terms such as "inner" and "outer" generally indicate a lesser or greater radial distance from, wherein a radial 106 may be in any direction perpendicular and radiating outward from axis 105.

In some embodiments, plug head 113 may feature a circular structure including a top surface 119, a bottom surface 120 (not shown), and an outer surface 116. Top surface 119 and bottom surface 120 may be located at opposite ends of plug head 113. In addition, plug head 113 may include a length from 3 mm to 5 mm and may include a diameter from 15 mm to 25 mm. In some embodiments, plug head 113 may include a length about 5 mm and a diameter about 20 mm. Socket 118 may be centrally located in top surface 119 and aligned to axis 105. Socket 118 may feature a hexagonal hole extending a certain distance from top surface 119. In some embodiments, socket 118 may include an across flat distance from 4 mm to 6 mm and a depth from 3 mm to 5 mm. Socket 118 may include an across flat distance approximately 6 mm and a depth approximately 5 mm. In addition, socket 118 may be configured to receive a tool, such as a driver or a wrench, to rotate grease plug 100 during installation.

As shown in the figure, receiving feature 117 may be located in plug head 113. Receiving feature 117 may be a channel ring (sometimes referred to as a plug head groove) located a certain distance in between top surface 119 and bottom surface 120. The channel ring may extend circumferentially around the outer surface 116. In some instances, the channel ring of receiving feature 117 includes a circular cross-section. In other instances, the channel ring of receiving feature 117 includes a rectangular cross-section as shown in the figure. The surface of the channel ring may be an inner surface 123. Inner surface 123 may be a surface offset a certain distance inwards from outer surface 116. The channel ring of receiving feature 117 may include a depth ranging 1 mm to 5 mm and a width from 1 mm to 5 mm. In some embodiments, the channel ring of receiving feature 117 may include a depth approximately 1.8 mm and a width approximately 1.8 mm. In some instances, the channel ring of receiving feature 117 may include a width equal or more than the diameter of anti-rotation component 202.

Receiving feature 117 may be configured to receive anti-rotation component 202. In some embodiments, receiving feature 117 may function as a guide for installation of anti-rotation component 202. Receiving feature 117 may include a first hole 121 extending a certain depth from the outer surface of receiving feature 117 into plug head 113. First hole 121 may extend all the way through plug head 113 to socket 118. A second hole 124 may be located on the opposite side of plug head 113 (shown in FIG. 15). The two holes may extend all the way through plug head 113, creating a through-hole through plug head 113. In such embodiments, the two holes may aid in the installation process of anti-rotation component 202 by providing two receiving locations for anti-rotation 202. First hole 121 and second hole 124 may include a diameter from 1 mm to 5 mm. In some embodiments, first hole 121 and second hole 124 may include a diameter of 2 mm. In some embodiments, first hole 121 and second hole 124 may include a diameter slightly larger than the diameter of anti-rotation component 202. As will be explained below for FIG. 15, certain features of anti-rotation component 202 may be configured to engage with certain features of receiving feature 117, first hole 121 and second hole 124.

Retaining groove 112 maybe located axially adjacent to plug head 113. In some embodiments, retaining groove 112 may be a channel extending a certain depth from outer surface 122 into plug body 115. Retaining groove 112 may include a depth about 1 mm and a width about 12 mm. Retaining groove 112 may be configured to retain a sealant mechanism, such as o-ring 250.

Plug body 115 may be located axially adjacent to retaining groove 112. Plug body 115 may feature a cylindrical structure extending from retaining groove 112. In some embodiments, outer surface 122 of plug body 115 may be threaded. In addition, outer surface 122 may be tapered. Plug body 115 may include a diameter from 6 mm to 111 mm and a length ranging from 10 mm to 50 mm. In some embodiments, plug body 115 may include a diameter from 6 mm to 50 mm and a length ranging from 10 mm to 25 mm. In some embodiments, plug body 115 may include a diameter approximately 14 mm and a length approximately 11 mm. Plug base 114 may be located axially adjacent to plug body 115.

Figure 15:
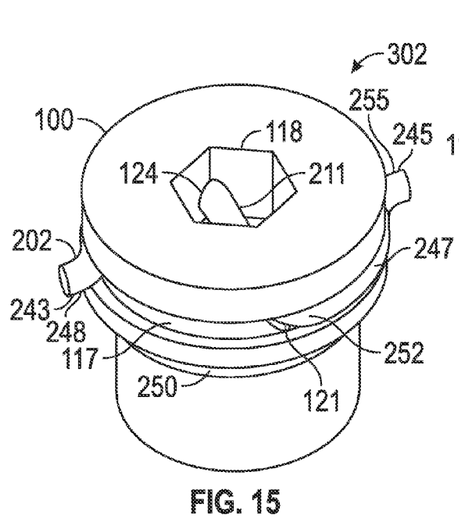
FIG. 15 is a perspective view of an embodiment of plug assembly 300.

FIG. 15 depicts a perspective view of an embodiment of a plug assembly 302. As shown, plug assembly 302 may include the embodiment of grease plug 100 illustrated in FIG. 14 and the embodiment of anti-rotation component 202 depicted in FIG. 13. O-ring 250, depicted in FIG. 4, may be assembled to grease plug 100, and may be positioned around retaining groove 112 of grease plug 100 (retaining groove 112 can be seen in FIG. 14). In embodiments where grease plug 100 includes a receiving feature 117 featuring a first hole 121 and a second hole 124, first locking feature 241 of anti-rotation component 202 may be assembled to receiving feature 117 and both holes. In some embodiments, first locking feature 241 may be inserted through both holes. As shown, the straight linear portion of first locking feature 241 may travel through first hole 121, socket 118, and second hole 124. The sharply curved portion of second bend 252 may wrap around the outside of first hole 121. A similar configuration for first bend 242 and second hole 124 may be formed. The assembly of first bend 242 and second bend 252 to either first hole 121 or second hole 124 is irrelevant and is disclosed for illustration purposes. The combination of first locking feature 241, first bend 242, and second bend 252 may lock anti-rotation component 202 within grease plug 100.

The semi-circular portion of first rounded portion 247 and second rounded portion 254 may wrap circumferentially around the channel ring of receiving feature 117. In addition, the bent portion of second locking feature 243 and third locking feature 245 may circumferentially extend outwards from within receiving feature 117. In some embodiments, second locking feature 243 and third locking feature 245 may extend out from receiving feature 117 by 2 mm to 3 mm. In particular embodiments, second locking feature 243 may extend past receiving feature 117 about 1.5 times the diameter of anti-rotation 200. The end of second locking feature 243 may include a first interference surface 248. The end of third locking feature 245 may include a second interference surface 255. First interference surface 248 and second interference surface 255 may be configured to engage with certain features of the hammer assembly, as described in FIG. 16 below.

In certain instances, anti-rotation component 202 may be a straight cylindrical tube that is bent into the corresponding shape as described in the above paragraph during the assembly of anti-rotation component 202 with plug assembly 302. This may occur before installation of plug assembly 302 into the hammer assembly. In other instances, anti-rotation component 202 may already be formed into the corresponding shape as described in the above paragraph and assembled with plug assembly 302.

Figure 16:
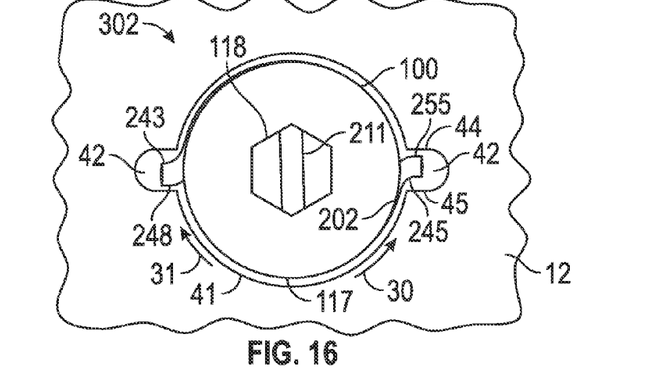
FIG. 16 is a top view of the embodiment of plug assembly 300 depicted in FIG. 15 installed in upper grease hole 41 of a cylindrical housing 12 within a hammer assembly.

FIG. 16 depicts a top view of an embodiment of plug assembly 302 installed in upper grease hole 41 of cylindrical housing 12 within a hammer assembly. Upper grease hole 41 may be located in a cylindrical housing 12 of a hammer assembly 10, such as the hammer assembly 10 depicted in FIG. 3. An identical plug assembly 302 may be installed in lower grease hole 43. This embodiment of plug assembly 302 may be the same as the embodiment depicted in FIG. 11. Anti-rotation component 202 may be pre-assembled with grease plug 100 to form plug assembly 302 before installing plug assembly 302 into upper grease hole 41. Normal installation of plug assembly 302 requires a clockwise turning direction as indicated by arrow 31. In instances where the plug body of grease plug 100 is threaded, plug assembly 302 may be screwed into upper grease hole 41 in the clockwise turning direction indicated by arrow 31. Upon complete rotation of plug assembly 302 into upper grease hole 41, o-ring 250 may be compressed between plug head 113 and upper grease hole 41 (not shown). In some embodiments, a sealant, such as one made by Loctite®, may be applied to seal the threading of the grease plug to the grease hole.

Components of anti-rotation component 202, such as third locking feature 245, may be compressed between receiving feature 117 (not shown) and the walls of upper grease hole 41. During the installation process, the orientation of second locking feature 243 and third locking feature 245 may allow plug assembly 302 to rotate freely in the clockwise direction. For example, as shown in the figure, plug assembly 302 may rotate to a position in which second locking feature 243, or third locking feature 245, or both, spring out into slot 42. This may be due to the release of compression forces. In some embodiments, third locking feature 245 may engage with a second face 45 of slot 42. Due to the resiliency of anti-rotation component 202 and its components, third locking feature 245 may compress back into receiving feature 117 upon further clockwise rotation of grease plug 302. In such instances, second interference surface 255 does not engage and cause interference with second face 45. This may be due to the orientation of third locking feature 245 in relation to second face 45.

In certain situations, such as during operation of the hammer assembly, plug assembly 302 may rotate opposite the direction of the screwing process, in this case counter-clockwise, within upper grease hole 41, despite frictional resistance from the threading of plug body 115 and upper grease hole 41. Plug assembly 302 may rotate counter-clockwise to a position in which second locking feature 243, or third locking feature 245, or both, spring out into slot 42. For example, in this position, third locking feature 245 may be oriented at an angle in which second interference surface 255 substantially contacts a first face 44 of slot 42. In some embodiments, the angle of third locking feature 245 may range from 0 to 60 degrees relative to the horizontal plane formed by first face 44. In particular instances, the angle of third locking feature 245 may be 45 degrees relative to the horizontal plane formed by first face 44. Second interference surface 255 may catch onto first face 44 and prevent further counter-clockwise rotation of plug assembly 302. This engagement between third locking feature 245 and slot 42 may lock plug assembly 302 to upper grease hole 41. The diameter of anti-rotation component 202 may be large enough to provide sufficient surface area for second interference surface 255 to substantially interfere with first face 44. A mirrored configuration of second locking feature 243, first interference surface 248, and slot 42 may be formed on the opposite side of plug assembly 302. In some embodiments, the combination of first interference surface 248 and second interference surface 255 may prevent counter-clockwise rotation of plug assembly 302.

In some embodiments, anti-rotation components 200, 201, and 202 may be composed of a resilient material. Anti-rotation components 200, 201, and 202 may be composed of a material such as, but not limited to, spring steel, plastic, aluminum, and copper. Anti-rotation components 200, 201, and 202 may be composed of ASTM A227.

INDUSTRIAL APPLICABILITY

Vibrational forces during the operation of a hydraulic hammer may loosen components of the hammer. Components, such as grease plugs 100 and 101 may vibrate and rotate within a hole, such as upper grease hole 41 or lower grease hole 43. Grease plugs 100 and 101 may rotate until they fall out of the hole, which may allow leakage from a fluidic chamber, such as grease channel 40. In embodiments where grease plug 100 or 101 includes a threaded base, the threading may not provide enough friction to hold the grease plug in place. The combination of grease plug 100 or 101 with a component, such as anti-rotation component 200, 201, or 202, may form a plug assembly 300, 301, or 302, that may prevent the associated grease plug from rotating or escaping. A plug assembly may be installed into a grease hole that includes at least one slot 42 along an edge of the grease hole. Certain features of anti-rotation component 200, 201, 202, such as a second locking feature 213, 233, or 243, may engage with slot 42 and prevent reverse rotation of a plug assembly. In such embodiments, second locking feature 213, 233, or 243 may utilize a springing mechanism to positively lock the plug assembly in place. Plug assembly 300, 301, or 302 may provide effective and cost efficient way to keep grease plugs within their designated holes.

The present invention may apply not only for hydraulic hammers, but also jackhammers, steam hammers, pneumatic hammers, or any type of mechanically powered hammer. In addition, the present invention may apply to any type of fastening mechanism used for to seal an open chamber. For example, the present invention may be applied to a screw type fastener, which relies only on torque or friction, to seal a chamber containing a gas, liquid, or semi-solid. Furthermore, the present invention may apply not only to the industrial tool industry, but also for automobile, aerospace, locomotive, or nautical based applications.

The preceding detailed description is merely exemplary in nature and is not intended to limit the invention or the application and uses of the invention. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A plug assembly, comprising:
a cylindrical plug centered on a longitudinal central axis, the cylindrical plug including a cylindrical plug head and a cylindrical plug body,
the plug head including a top surface, a bottom surface located opposite the top surface, and an outer surface extending circumferentially about the longitudinal central axis between the top surface and bottom surface,
the plug head defining a receiving feature including a channel ring and an inner surface, the channel ring being located axially away from the bottom surface, the channel ring extending circumferentially around the outer surface, the channel ring extending radially inward from the outer surface by a channel depth to the inner surface,
the plug body extending along the longitudinal central axis away from the bottom surface of the plug head; and
an anti-rotation component including a first locking feature and a second locking feature,
the first locking feature being fixed to the cylindrical plug by engagement with the receiving feature, and
the second locking feature extending beyond the outer surface of the plug head along a radial direction, the radial direction being perpendicular to the longitudinal central axis.

2. The plug assembly of claim 1, wherein the inner surface of the plug head defines a hole, the channel ring is circular, and the first locking feature is a straight linear portion of the anti-rotation component.

3. The plug assembly of claim 2, wherein the first locking feature extends at least partially into the hole.

4. The plug assembly of claim 1, wherein the channel ring is an octagonal channel ring, and the first locking feature is fixed to the cylindrical plug by engagement with at least one side of a plurality of sides of the octagonal channel ring.

5. The plug assembly of claim 1, wherein the second locking feature is a straight linear portion of the anti-rotation component, the straight linear portion extending straight and linear in a plane defined by the radial direction and a circumferential direction about the longitudinal axis.

6. The plug assembly of claim 1, wherein the second locking feature is a tooth.

7. The plug assembly of claim 1, wherein the second locking feature is a bent portion.

8. The plug assembly of claim 1, wherein a diameter of the anti-rotation component is within a range of 1 mm to 5 mm.

9. The plug assembly of claim 1, wherein the plug body defines a retaining groove extending circumferentially around the plug body, and
wherein the plug assembly further comprises a sealant mechanism assembled within the retaining groove.

10. The plug assembly of claim 1, wherein the anti-rotation component comprises a resilient material.

11. The plug assembly of claim 1, wherein the second locking feature defines a first terminal end of the anti-rotation component.

12. The plug assembly of claim 11, wherein the first locking feature defines a second terminal end of the anti-rotation component.

13. A hammer assembly including a grease hole, a slot extending radially outward from the grease hole, and the plug assembly of claim 1, wherein the second locking feature is engaged with the slot.

14. A plug assembly, comprising:
a conduit body having an internal surface and an external surface, the internal surface of the conduit body defining a fluid conduit along a longitudinal axis, the external surface of the conduit body defining a slot that is recessed from an upper face of the external surface along the longitudinal axis, the slot extending outward from the internal surface along a radial direction, the radial direction being perpendicular to the longitudinal axis;
a cylindrical plug disposed in the fluid conduit along the longitudinal axis, the cylindrical plug including a cylindrical plug head and a cylindrical plug body,
the plug head including a top surface, a bottom surface located opposite the top surface, and an outer surface extending circumferentially about the longitudinal axis between the top surface and bottom surface,
the top surface defining a socket that is recessed into the plug head along the longitudinal axis,
the plug head defining a receiving feature located between the top surface and the bottom surface, the receiving feature including a plug head groove extending circumferentially about the outer surface, a first hole extending through the plug head groove, and a second hole extending through the plug head groove opposite the first hole;
the plug body extending along the longitudinal axis away from the bottom surface of the plug head; and
an anti-rotation component including
a first end,
a second end located opposite the first end,
a plug locking feature,
at least one curved portion adjacent to the plug locking feature,
a rounded portion adjacent to the at least one curved portion, and
a first slot locking feature adjacent to the rounded portion and adjacent to the second end,
the plug locking feature being fixed to the plug head by engagement with either the first hole or the second hole of the cylindrical plug,
the first slot locking feature extending beyond the outer surface of the plug head along the radial direction and being engaged with the slot to prevent counter-rotation of the cylindrical plug relative to the conduit body about the longitudinal axis.

15. The plug assembly of claim 14, wherein the anti-rotation component further includes a second slot locking feature located adjacent to the first end, the first slot locking feature and second slot locking feature both including a bent portion.

16. The plug assembly of claim 14, wherein the plug locking feature is a straight linear portion of the anti-rotation component that extends at least partially into the first hole and the second hole.

17. The plug assembly of claim 14, wherein the first slot locking feature is a straight linear portion that is configured to spring out radially into the slot during rotation of the plug assembly relative to the conduit body.

18. The plug assembly of claim 14, wherein the first slot locking feature defines a first terminal end of the anti-rotation component, and the first terminal end of the anti-rotation component is engaged with the slot.

19. The plug assembly of claim 18, wherein the plug locking feature defines a second terminal end of the anti-rotation component.

20. The plug assembly of claim 14, wherein the fluid conduit is a grease channel of a powered hammer assembly.

* * * * *